US006895445B2

(12) United States Patent
Ying et al.

(10) Patent No.: US 6,895,445 B2
(45) Date of Patent: May 17, 2005

(54) DOCKING STATIONS FOR TRANSFERRING DATA BETWEEN HANDHELD ELECTRONIC DEVICES AND OTHER DEVICES VIA INFRARED COMMUNICATIONS

(75) Inventors: Alan J. Ying, Durham, NC (US); William T. Lawson, Apex, NC (US); Stanley S. Coe, Raleigh, NC (US)

(73) Assignee: MercuryMD, Inc., Durham, NC (US)

( * ) Notice: Subject to any disclaimer, the term of this patent is extended or adjusted under 35 U.S.C. 154(b) by 254 days.

(21) Appl. No.: 10/156,475

(22) Filed: May 28, 2002

(65) Prior Publication Data

US 2003/0225939 A1 Dec. 4, 2003

(51) Int. Cl.[7] .................................................. G06F 3/00
(52) U.S. Cl. ........................... 710/1; 710/62; 710/303; 710/304; 398/115; 398/117
(58) Field of Search .................. 710/1–7, 62, 303–304; 398/115–117

(56) References Cited

U.S. PATENT DOCUMENTS

| | | | |
|---|---|---|---|
| 5,465,038 A | | 11/1995 | Register ......................... 320/2 |
| 5,530,578 A | | 6/1996 | Takemoto et al. .......... 359/152 |
| 5,717,203 A | * | 2/1998 | Yung ........................... 250/221 |
| 5,822,101 A | | 10/1998 | Deguchi ..................... 359/172 |
| 5,859,628 A | | 1/1999 | Ross et al. ................... 345/173 |
| 5,864,708 A | | 1/1999 | Croft et al. .................. 395/821 |
| 5,900,958 A | | 5/1999 | Nakamura ................... 359/159 |
| 5,903,374 A | | 5/1999 | Kobayashi ................... 359/159 |
| 5,974,334 A | * | 10/1999 | Jones, Jr. .................. 455/556.2 |
| 5,978,569 A | * | 11/1999 | Traeger ....................... 709/244 |
| 6,104,606 A | | 8/2000 | Vossler ....................... 361/686 |
| 6,115,160 A | | 9/2000 | Anzai et al. ................ 359/152 |
| 6,230,214 B1 | * | 5/2001 | Liukkonen et al. ............ 710/1 |
| 6,236,486 B1 | | 5/2001 | Nocker, IV ................. 359/159 |
| 6,246,577 B1 | * | 6/2001 | Han et al. ................... 361/686 |
| D444,472 S | * | 7/2001 | Russell et al. ............. D14/434 |
| 6,255,800 B1 | * | 7/2001 | Bork .......................... 320/115 |
| 6,301,035 B1 | * | 10/2001 | Schairer ..................... 398/128 |
| 6,442,639 B1 | * | 8/2002 | McElhattan et al. ........ 710/303 |

* cited by examiner

Primary Examiner—Kim Huynh
Assistant Examiner—Mike Nguyen
(74) Attorney, Agent, or Firm—Myers Bigel Sibley & Sajovec, P.A.

(57) ABSTRACT

Docking stations for transferring data between handheld electronic devices and various data input/output devices are provided. A docking station includes a housing, an infrared (IR) signal emitter disposed within the housing, and one or more cradles formed within the housing. Each cradle is configured to removably receive a handheld electronic device therein and includes a floor and a first peripheral wall extending outwardly from the floor in a direction transverse to the floor. The first peripheral wall is permeable to IR signals. A second peripheral wall surrounds the first peripheral wall in adjacent, spaced-apart relationship such that the first and second peripheral walls define a peripheral area. The second peripheral wall comprises an IR-reflective inner surface. A cylindrical lens is positioned within the peripheral area and is configured to receive IR signals from an IR emitter and scatter the IR signals throughout the peripheral area. The IR-reflective surface is configured to reflect the scattered IR signals through the IR-permeable first peripheral wall and into the cradle.

21 Claims, 5 Drawing Sheets

DOCKING STATIONS FOR TRANSFERRING DATA BETWEEN HANDHELD ELECTRONIC DEVICES AND OTHER DEVICES VIA INFRARED COMMUNICATIONS

FIELD OF THE INVENTION

The present invention relates generally to handheld electronic devices and, more particularly, to transferring data between handheld electronic devices and other devices.

BACKGROUND OF THE INVENTION

Increasingly, people are utilizing handheld electronic devices to perform a variety of computing and communications functions, including sending and retrieving e-mail, Web browsing, and data-sharing applications over the Internet, intranet and/or corporate networks. Many handheld electronic devices are small enough to be held by one hand and typically include such features as handwriting recognition, pop-up keypads and number pads, communication software for Internet access, and the ability to hook up to a docking station to exchange information therewith.

The term "handheld electronic device" as used herein includes, but is not limited to, personal digital assistants (PDAs), radiotelephones, web-enabled radiotelephones, and other mobile/wireless devices. Exemplary handheld electronic devices are available from Handspring, Inc., Mountain View, Calif.; Palm, Inc., Santa Clara, Calif.; Compaq Computer Corporation, Houston, Tex.; Hewlett-Packard Company, Palo Alto, Calif.; IBM, Armonk, N.Y.; HandEra, Inc., Des Moines, Iowa; Psion PLC, London, UK; Nokia Corporation, Keilalahdentie, Finland; Ericsson, Inc., New York, N.Y.; and Motorola, Inc., Schaumburg, Ill.

To transfer data between handheld electronic devices and other devices, such as desktop computers, central computers and/or computer networks, docking stations may be utilized. Typically a docking station is designed for use with a specific handheld electronic device model, and includes a cradle within which the handheld electronic device is positioned. Typically, data is transferred between another device and the handheld electronic device via an infrared (IR) communication port in the docking station cradle and an IR communication port in the handheld electronic device.

The IR communication ports in the docking station and handheld electronic device typically require line-of-sight alignment, as well as close proximity to each other. Because of these strict alignment requirements, other handheld electronic devices having IR communication ports in different locations may not be capable of transferring data via the docking station cradle. For example, a Handspring® handheld electronic device may not be able to transfer data via a docking station designed for a Palm® handheld electronic device.

Various efforts have been made in the field of infrared communications between electronic devices. For example, U.S. Pat. No. 5,864,708 to Croft et al. describes a docking station for a portable computer, wherein communications between the portable computer and docking station may be established as long as an infrared communication port on the back panel of the portable computer is lined up somewhere within the window of the docking station. U.S. Pat. No. 5,900,958 to Nakamura describes a communication apparatus that is capable of receiving IR signals without regard to orientation. An IR signal incident to the apparatus is transmitted through an IR signal inlet implemented by a one-way mirror. Subsequently, the IR signal is sequentially reflected by reflectors and the IR signal inlet to reach an IR signal receiving portion.

Unfortunately, these methods of data transfer may not allow a single docking station to facilitate data transfer with various handheld electronic devices having infrared communications ports in widely differing locations from one another.

SUMMARY OF THE INVENTION

In view of the above, embodiments of the present invention provide docking stations for transferring data between handheld electronic devices and various data input/output devices. A docking station according to embodiments of the present invention includes a housing, an infrared (IR) signal emitter disposed within the housing, and one or more cradles formed within the housing. Each cradle is configured to removably receive a handheld electronic device therein and includes a floor and a first peripheral wall extending outwardly from the floor in a direction transverse to the floor. The first peripheral wall is permeable to IR signals. A second peripheral wall surrounds the first peripheral wall in adjacent, spaced-apart relationship such that the first and second peripheral walls define a peripheral area. The second peripheral wall comprises an IR-reflective inner surface (e.g., a white surface).

A cylindrical lens is positioned within the peripheral area and is configured to receive IR signals from an IR emitter and scatter the IR signals throughout the peripheral area. The IR-reflective surface is configured to reflect the scattered IR signals through the IR-permeable first peripheral wall and into the cradle. Accordingly, the IR communication port of a handheld device positioned within each cradle can receive IR signals from the cradle no matter where the IR communication port is located on the handheld device.

According to embodiments of the present invention, a pair of recessed portions are formed within the floor of each cradle and are configured to allow a user to reach under a handheld electronic device positioned within the cradle to facilitate removal therefrom.

According to embodiments of the present invention, an indicator (e.g., a light) is provided on the housing adjacent each cradle and is configured to indicate when data transfer with an electronic device disposed within the particular cradle is complete.

DETAILED DESCRIPTION OF THE INVENTION

The present invention now is described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

Docking stations according to embodiments of the present invention may be used to transfer data with many types of handheld devices capable of communicating via infrared signals. Accordingly, embodiments of the present invention are not limited to a particular type of handheld electronic device.

Figure 1:
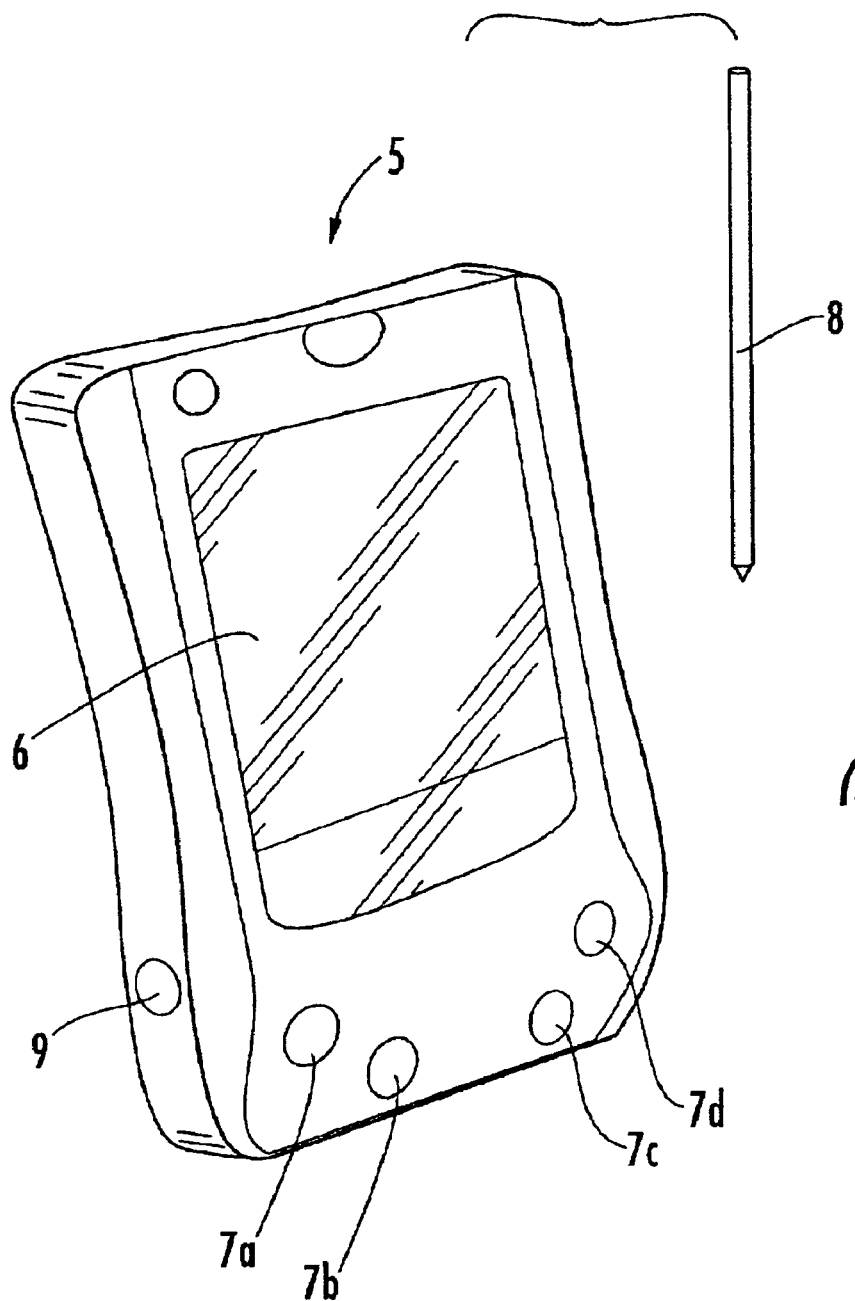
FIG. 1 is a perspective view of an exemplary handheld electronic device.

FIG. 1 depicts an exemplary handheld electronic device 5 that includes a display screen 6, operational buttons 7a, 7b, 7c, 7d and a stylus 8. A more extensive keyboard (not shown) may also be included as an attachment or as an integrated part of the handheld device 5. The display screen 6 may utilize "touch screen" technology, which allows a user to interact with the display screen 6 using, for example, their finger or the stylus 8. The illustrated handheld device 5 also includes an infrared port 9 for transferring data into and from the handheld electronic device 5 via a docking station.

Figure 2:
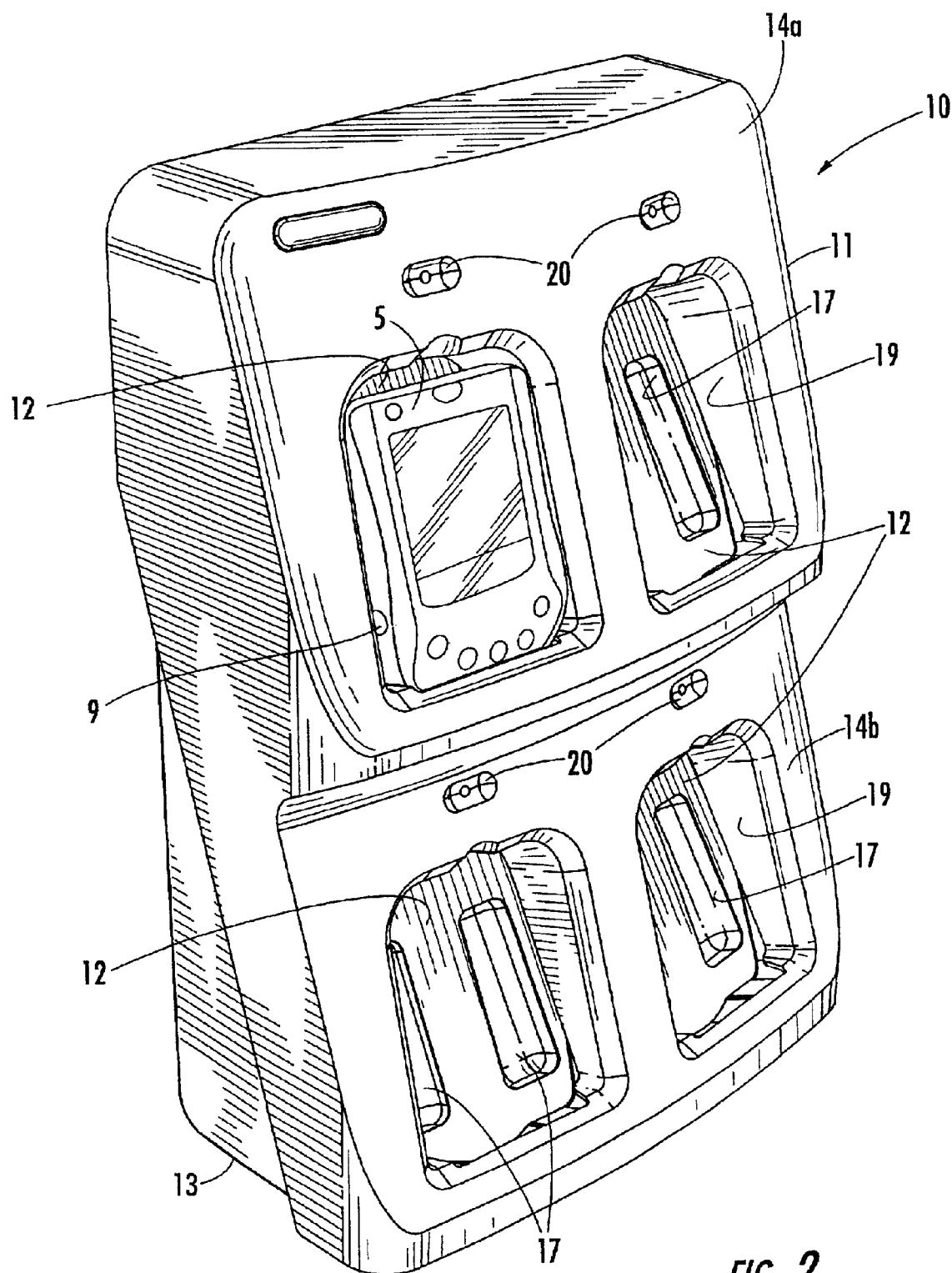
FIG. 2 is a perspective view of a docking station according to embodiments of the present invention.

Referring now to FIG. 2, a docking station 10, according to embodiments of the present invention, that serves as a data transfer interface between handheld electronic devices and data input/output devices, is illustrated. The illustrated docking station 10 includes a housing 11 having a base 13 and a plurality of cavities or cradles 12 formed therein, each of which is configured to receive a respective handheld electronic device 5 therein. The illustrated docking station 10 includes four cradles 12 for receiving four respective handheld devices therewithin. Two cradles 12 are formed within an upper front wall portion 14a of housing 11, and two cradles 12 are formed within a lower front wall portion 14b of housing 11. However, embodiments of the present invention are not limited to the illustrated number and arrangement of cradles 12. Docking stations according to embodiments of the present invention may have a single cradle 12 or multiple cradles 12 arranged in any configuration.

The illustrated docking station 10 is configured to be placed via its base 13 on a horizontal surface, such as a table, so that handheld electronic devices placed within the cradles 12 can be seen and accessed easily by a user. The illustrated docking station 10 is also configured to be mounted on a substantially vertical surface, such as a wall, so that handheld electronic devices placed within the cradles 12 can be seen and accessed easily by a user. The housing 11 may be formed from various materials including, but not limited to, plastics, metals, etc. In addition, the docking station housing 11 may have various shapes and configurations without limitation.

Data transferred between handheld electronic devices within the cradles 12 and other devices is converted to IR signals capable of being received and understood by a handheld electronic device disposed within each of the cradles 12 of the docking station 10. Each cradle 12 has a respective IR emitter/receiver for transferring and receiving data with/from a respective handheld device disposed therewithin. IR emitters and receivers are well known to those skilled in the art and need not be described further herein. Embodiments of the present invention may utilize combined IR emitters and receivers, or IR emitters and receivers that are separate devices.

Figure 3:
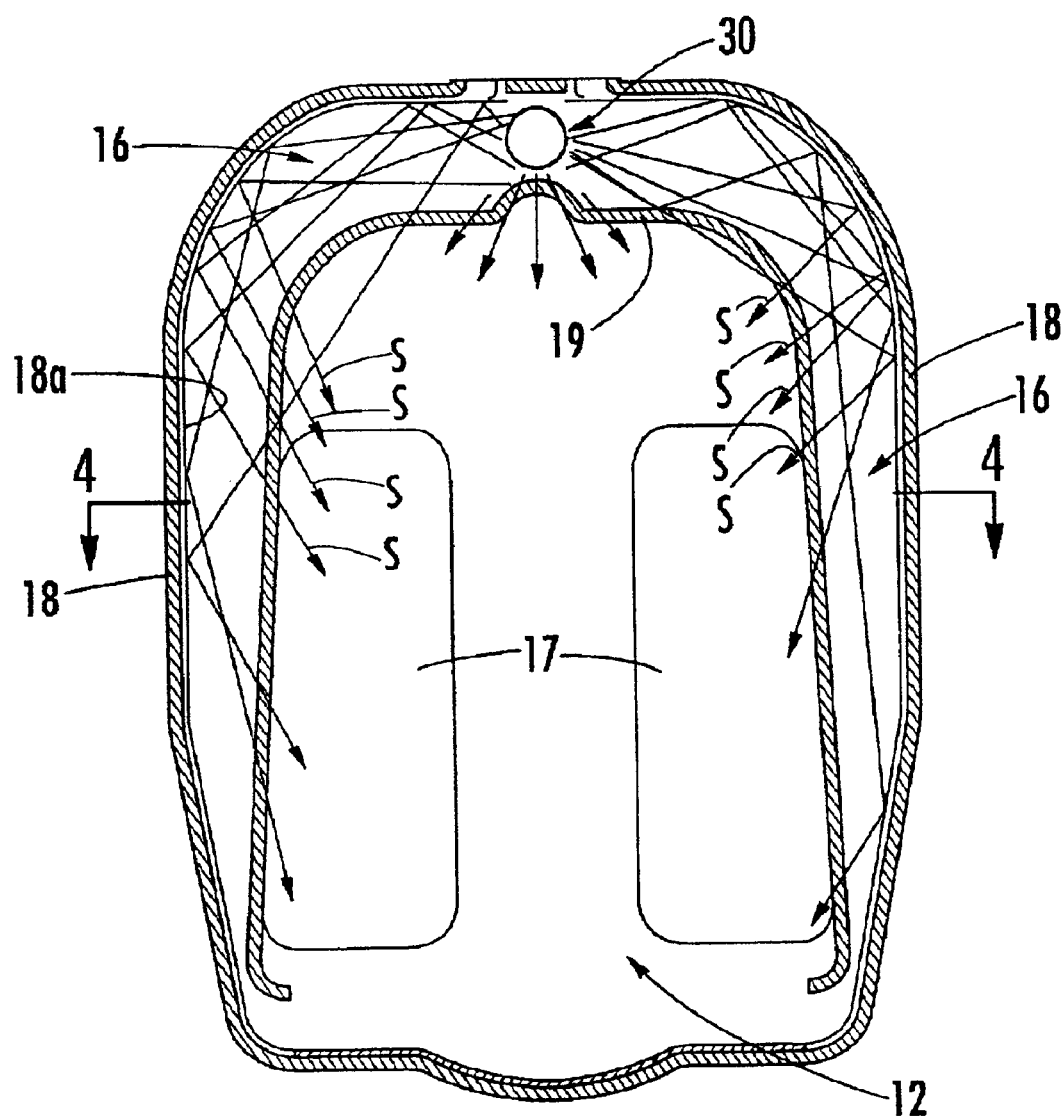
FIG. 3 is a cutaway plan view of a cradle of the docking station of FIG. 2, according to embodiments of the present invention, and taken along lines 3—3 of FIG. 4.

Referring now to FIG. 3, a cutaway plan view of one of the cradles 12, in the illustrated docking station 10 of FIG. 2 is illustrated. A peripheral area 16 surrounds each cradle 12 and includes an outer wall 18 having an IR-reflective inner surface (e.g., a white surface) 18a and an inner wall 19 that is permeable to IR signals (IR signals are indicated as "S"). A cylindrical lens 30 is positioned within the peripheral area 16 as illustrated, and is in communication with an IR source (emitter) (44, FIG. 5). (It is understood that the an IR emitter may also include an IR receiver, as described above.) The cylindrical lens 30 diffuses an IR beam from an IR emitter 44 such that the reflections of the diffuse beam saturate the peripheral area 16 surrounding the cradle 12. As such, the orientation and position of a handheld electronic device within the cradle is not important. This is especially advantageous in the transfer of data via TCP/IP protocol because the saturating effect of the IR signals reduces the likelihood of packet loss.

The cylindrical lens 30 may be formed from any type of lens material including, but not limited to glass, polymeric material, quartz, etc. In addition, cylindrical lens 30 may have any size and orientation necessary for installation within the peripheral area 16.

Figure 4:
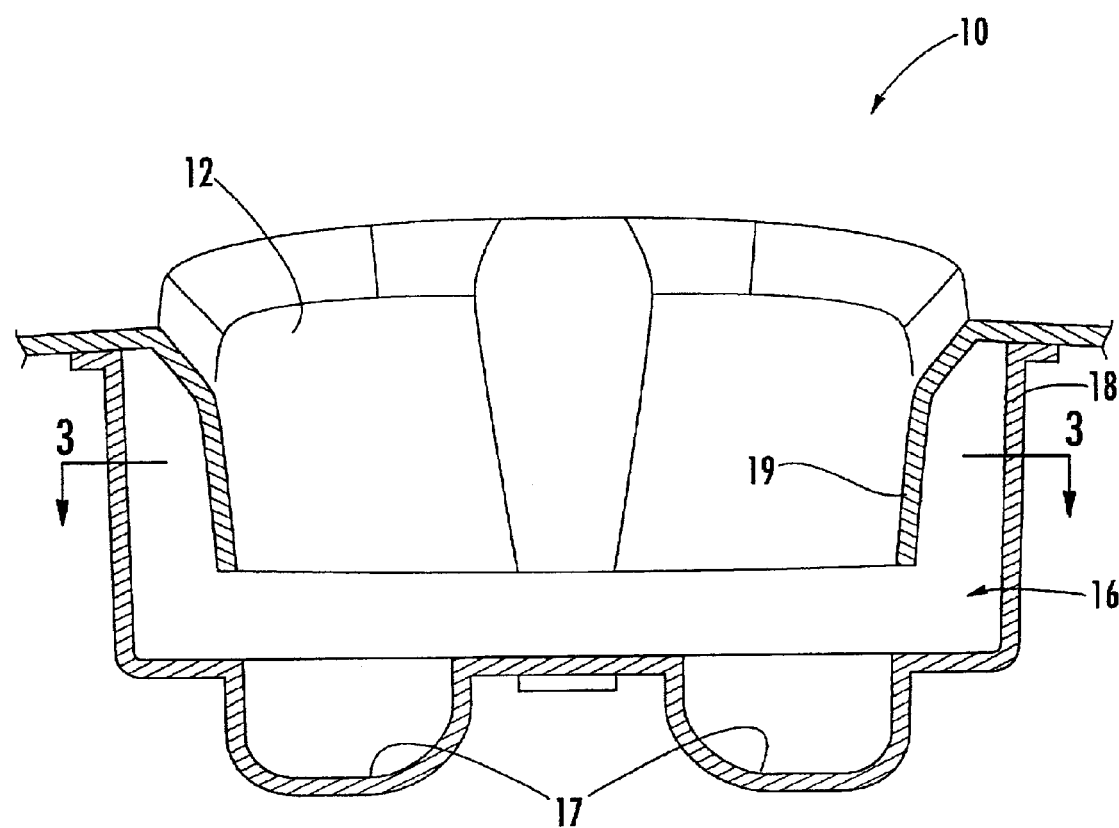
FIG. 4 is a cross-sectional view of the cradle of FIG. 3 taken along lines 4—4.

Each cradle 12 also includes a pair of recessed portions 17. The recessed portions 17 allow a user's fingers to reach partially under a handheld device positioned within the cavity and thereby facilitate removal of a handheld device from the cavity. FIG. 4 is a cross-sectional view of the cradle 12 of FIG. 3 illustrating the peripheral area 16 and the pair of recessed portions 17.

The illustrated docking station 10 includes a light 20 (FIG. 5) positioned adjacent to each respective cradle 12 that serves as an indicator that data transfer between a handheld electronic device placed within a respective cradle 12 and a data input/output device has been completed. Each light 20 may also serve as an indicator of ongoing/active data transfer, as well.

IR signals generated by an IR emitter for each cradle 12 are scattered by the cylindrical lens 30, reflected by the IR-reflective surface 18a of the outer wall 18, and directed into the cradle 12 through the IR-permeable inner wall 19. As such, the IR communication port of a handheld device positioned within the cradle 12 can receive IR signals from the cradle 12 no matter where the IR communication port is located on the sides or top of the handheld electronic device.

The peripheral area 16 surrounding a cradle 12 is flooded with IR signals such that any handheld electronic device having an IR communication port on the sides or top thereof can transfer data via the docking station 10. The peripheral area 16 provides a significantly larger percentage of diode surface activation, thus stronger signal reception, in an IR communications port of a handheld electronic device than conventional docking stations.

Figure 5:
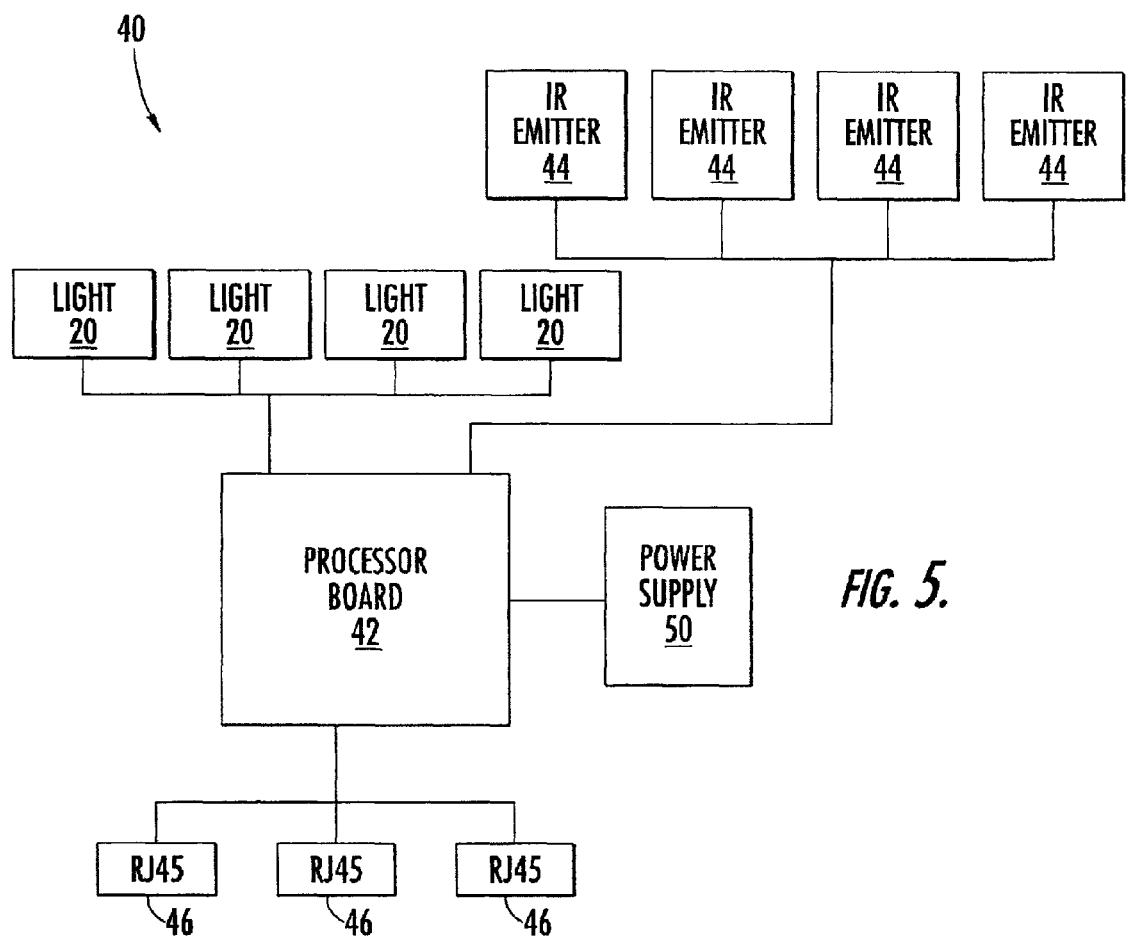
FIG. 5 is a schematic diagram of an IR communications system within the docking station of FIG. 2, according to embodiments of the present invention.

Referring to FIG. 5, an IR communications system (generally designated as 40) that serves as a data transfer interface between a handheld electronic device within a cradle 12 and a data input/output device, according to embodiments of the present invention, is illustrated. Various IR communications systems may be utilized with docking stations according to embodiments of the present invention. Embodiments of the present invention are not limited to the illustrated IR communications system 40. Moreover, IR communications systems for emitting and receiving IR signals via docking stations are well known to those skilled in the art and, as such, will only be briefly described below.

The illustrated IR communications system 40 includes a processor board 42 (available from Clarinet Systems, Inc., 41539 Albrae Street, Fremont, Calif. 94538) in communication with a plurality of IR signal emitters/receivers 44 (e.g., an EthIR Beam PC board, available from Clarinet Systems, Inc.). Each IR signal emitter 44 is in communication with a cylindrical lens 30 within the peripheral area 16 surrounding a respective cradle 12. The processor board 42 is in communication with a plurality of cable connectors 46 (e.g., RJ45 connectors) to facilitate data transfer between handheld electronic devices within the cradles 12 and external data input/output devices, and to facilitate chaining multiple docking stations 10 together. The processor board 42 is also in communication with the indicator lights 20 associated with the cradles 12 that indicate when data transfer has been completed.

The processor board 42 receives power from a power source 50 (e.g., AC power source), as would be understood by those skilled in the art. According to embodiments of the present invention, the processor board 42 may also receive power from a DC power source, as would be understood by those skilled in the art.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A docking station for handheld electronic devices, comprising:
   a housing;
   an infrared (IR) signal emitter disposed within the housing;
   a cradle formed within the housing, wherein the cradle is configured to removably receive a handheld electronic device therein, wherein the cradle comprises a floor and a first peripheral wall extending outwardly from the floor in a direction transverse to the floor, wherein the first peripheral wall is permeable to IR signals;
   a second peripheral wall that surrounds the first peripheral wall in adjacent, spaced-apart relationship, wherein the first and second peripheral walls define a peripheral area, and wherein the second peripheral wall comprises an IR-reflective inner surface; and
   a lens positioned within the peripheral area, wherein the lens is configured to receive IR signals from the IR emitter and scatter the IR signals throughout the peripheral area, and wherein the IR-reflective surface is configured to reflect the scattered IR signals through the IR-permeable first peripheral wall and into the cradle.

2. The docking station of claim 1, wherein the lens has a cylindrical configuration.

3. The docking station of claim 1, wherein the first peripheral wall has a U-shaped configuration, and wherein the second peripheral wall has a U-shaped configuration.

4. The docking station of claim 1, wherein a pair of recessed portions are formed within the cradle floor and are configured to allow a user to reach under a handheld electronic device positioned within the cradle.

5. The docking station of claim 1, wherein the housing comprises a base that is configured to support the docking station on a horizontal surface.

6. The docking station of claim 1, wherein the IR-reflective inner surface comprises a white surface.

7. The docking station of claim 1, further comprising an indicator on the housing adjacent the cradle that is configured to indicate when data transfer with an electronic device disposed within the cradle is complete.

8. The docking station of claim 7, wherein the indicator comprises a light.

9. The docking station of claim 1, further comprising a plurality of cradles formed within the housing, wherein each cradle is configured to removably receive a respective electronic device therein.

10. A docking station for handheld electronic devices, comprising:
    a housing;
    an infrared (IR) signal emitter disposed within the housing;
    a cradle formed within the housing, wherein the cradle is configured to removably receive a handheld electronic device therein, wherein the cradle comprises a floor and a generally U-shaped first peripheral wall extending outwardly from the floor in a direction transverse to the floor, wherein the first peripheral wall is permeable to IR signals;
    a generally U-shaped second peripheral wall that surrounds the first peripheral wall in adjacent, spaced-apart relationship, wherein the first and second peripheral walls define a peripheral area, and wherein the second peripheral wall comprises an IR-reflective inner surface; and
    a cylindrical lens positioned within the peripheral area, wherein the lens is configured to receive IR signals from the IR emitter and scatter the IR signals throughout the peripheral area, and wherein the IR-reflective surface is configured to reflect the scattered IR signals through the IR-permeable first peripheral wall and into the cradle.

11. The docking station of claim 10, wherein a pair of recessed portions are formed within the cradle floor and are configured to allow a user to reach under a handheld electronic device positioned within the cradle.

12. The docking station of claim 10, wherein the housing comprises a base that is configured to support the docking station on a horizontal surface.

13. The docking station of claim 10, wherein the IR-reflective inner surface comprises a white surface.

14. The docking station of claim 10, further comprising an indicator on the housing adjacent the cradle that is configured to indicate when data transfer with an electronic device disposed within the cradle is complete.

15. The docking station of claim 14, wherein the indicator comprises a light.

16. The docking station of claim 10, further comprising a plurality of cradles formed within the housing, wherein each cradle is configured to removably receive a respective electronic device therein.

17. A docking station for handheld electronic devices, comprising:
    a housing;
    an infrared (IR) signal emitter disposed within the housing;

a cradle formed within the housing, wherein the cradle is configured to removably receive a handheld electronic device therein, wherein the cradle comprises a floor and a generally U-shaped first peripheral wall extending outwardly from the floor in a direction transverse to the floor, wherein the first peripheral wall is permeable to IR signals;

at least one recessed portion formed within the cradle floor that is configured to allow a user to reach partially under an electronic device positioned within the cradle;

a generally U-shaped second peripheral wall that surrounds the first peripheral wall in adjacent, spaced-apart relationship, wherein the first and second peripheral walls define a peripheral area, and wherein the second peripheral wall comprises an IR-reflective inner surface;

a cylindrical lens positioned within the peripheral area, wherein the lens is configured to receive IR signals from the IR emitter and scatter the IR signals throughout the peripheral area, and wherein the IR-reflective surface is configured to reflect the scattered IR signals through the IR-permeable first peripheral wall and into the cradle; and an indicator on the housing adjacent the cradle that is configured to indicate when data transfer with an electronic device disposed within the cradle is complete.

18. The docking station of claim 17, wherein the housing comprises a base that is configured to support the docking station on a horizontal surface.

19. The docking station of claim 17, wherein the IR-reflective inner surface comprises a white surface.

20. The docking station of claim 17, wherein the indicator comprises a light.

21. The docking station of claim 17, further comprising a plurality of cradles formed within the housing, wherein each cradle is configured to removably receive a respective electronic device therein.

* * * * *